US 9,779,517 B2

(12) United States Patent
Ballard et al.

(10) Patent No.: US 9,779,517 B2
(45) Date of Patent: Oct. 3, 2017

(54) METHOD AND SYSTEM FOR REPRESENTING AND INTERACTING WITH AUGMENTED REALITY CONTENT

(71) Applicants: Brian Adams Ballard, Herndon, VA (US); Jeff Jenkins, Clarksburg, MD (US); Edward Robert English, Falls Church, VA (US); Todd Richard Reily, Stoneham, MA (US); James Leighton Athey, Washington, DC (US)

(72) Inventors: Brian Adams Ballard, Herndon, VA (US); Jeff Jenkins, Clarksburg, MD (US); Edward Robert English, Falls Church, VA (US); Todd Richard Reily, Stoneham, MA (US); James Leighton Athey, Washington, DC (US)

(73) Assignee: Upskill, Inc., Vienna, VA (US)

( * ) Notice: Subject to any disclaimer, the term of this patent is extended or adjusted under 35 U.S.C. 154(b) by 80 days.

(21) Appl. No.: 14/212,525

(22) Filed: Mar. 14, 2014

(65) Prior Publication Data
US 2014/0267419 A1 Sep. 18, 2014

Related U.S. Application Data

(60) Provisional application No. 61/798,846, filed on Mar. 15, 2013.

(51) Int. Cl.
*G06T 11/00* (2006.01)

(52) U.S. Cl.
CPC .................... *G06T 11/00* (2013.01)

(58) Field of Classification Search
CPC ....................................................... G06T 11/00
USPC ........................................................ 345/633
See application file for complete search history.

(56) References Cited

U.S. PATENT DOCUMENTS

| 7,138,963 | B2 | 11/2006 | Hobgood et al. |
| 7,714,895 | B2 * | 5/2010 | Pretlove ................. B25J 9/1656 |
| | | | 348/115 |
| 7,868,904 | B2 * | 1/2011 | Morita ................... G06T 19/006 |
| | | | 345/629 |
| 2009/0081959 | A1 | 3/2009 | Gyorfi et al. |

(Continued)

OTHER PUBLICATIONS

International Search Report and Written Opinion for International Application No. PCT/US2014/028272, dated Jul. 24, 2014 (12 pages).

*Primary Examiner* — Devona Faulk
*Assistant Examiner* — Hai Tao Sun
(74) *Attorney, Agent, or Firm* — Finnegan, Henderson, Farabow, Garrett & Dunner, LLP (57) ABSTRACT

Systems and methods for displaying augmented reality (AR) content are disclosed. The AR device may include a display configured to display real-world content overlaid with AR content and at least one sensor configured to provide an output indicative of an orientation, location, or motion of the AR device. The system may also include a processor device configured to: cause the AR content to be shown on the display at an initial location on the display; determine a change in orientation of the AR device based on the output of the at least one sensor; and change a position of the AR content on the display to a second location on the display, wherein the change in position of the AR content from the initial location to the second location is related to the determined change in orientation of the AR device.

15 Claims, 9 Drawing Sheets

(56) References Cited

U.S. PATENT DOCUMENTS

| | | |
|---|---|---|
| 2010/0103241 A1 | 4/2010 | Linaker |
| 2010/0185529 A1 | 7/2010 | Chestbut et al. |
| 2010/0287485 A1* | 11/2010 | Bertolami ............... G06F 3/011 715/764 |
| 2011/0090252 A1 | 4/2011 | Yoon et al. |
| 2011/0165893 A1 | 7/2011 | Hyung et al. |
| 2012/0047233 A1 | 2/2012 | Jun |
| 2012/0120103 A1* | 5/2012 | Border ................. G02B 27/017 345/633 |
| 2012/0188148 A1* | 7/2012 | DeJong .............. G02B 27/0093 345/8 |
| 2012/0212405 A1* | 8/2012 | Newhouse ........... G02B 27/017 345/156 |
| 2012/0249588 A1 | 10/2012 | Tison et al. |

\* cited by examiner

METHOD AND SYSTEM FOR REPRESENTING AND INTERACTING WITH AUGMENTED REALITY CONTENT

PRIORITY

This application is based on and claims priority to U.S. Provisional Application No. 61/798,846, filed on Mar. 15, 2013, which is incorporated herein by reference in its entirety.

TECHNICAL FIELD

The present disclosure relates generally to augmented reality content and more particularly, to methods and systems for representing and interacting with augmented reality content.

BACKGROUND

Technology advances have enabled mobile personal computing devices to become more capable and ubiquitous. In many cases these devices will have both a display as well as a combination of sensors, for example, GPS, accelerometers, gyroscopes, cameras, light meters, and compasses or some combination thereof. These devices may include mobile computing devices as well as head mounted displays.

These mobile personal computing devices are increasingly capable of both displaying information for the user as well as supplying contextual information to other systems and applications on the device. Such contextual information can be used to determine the location, orientation and movement of the user interface display of the device.

SUMMARY

In some embodiments, an augmented reality (AR) device is provided. The AR device may include a see-through or semi-transparent display (e.g., a display that allows transmission of at least some visible light that impinges upon the AR device) that allows the user to see the real-world environment and to display generated images superimposed over or provided in conjunction with a real-world view as perceived by the wearer through the lens elements. The AR device may also include electronic or analog sensors that can be used to establish and/or track the physical context of the display. By way of example and without limitation, the sensors could include any one or more of a motion detector (e.g., a gyroscope and/or an accelerometer), a camera, a location determination device (e.g., a GPS device, an NFC reader), a magnetometer, and/or an orientation sensor (e.g., a theodolite, infra-red sensor).

In some embodiments, the display on the AR device may provide a visual representation of some number of virtual objects in two-dimensional or three-dimensional space that are visible in the user's current field of view. These virtual objects make up the virtual content displayed on the AR device. The virtual content may overlay the real world content visible to the user, creating an Augmented Reality (AR) environment for the user. Additionally, the display may include a visual representation of a reticle with a fixed point of reference to the user, or other virtual selection objects or pointers that allow the user to select specific virtual objects.

A user wishing to move an AR object within or out of the field of view may use the reticle or other selection device to select the AR content. After selecting the AR content, the user can then designate a position in which to place the AR content. The position can be anywhere inside the field of view or anywhere outside of the field of view of the AR device. If the AR content is placed outside of the field of view of the user, then the content will not be visible to the user until the field of view of the AR device is moved so that it overlaps with the user-designated position of the AR content. When the AR content is returned to the field of view of the AR device, the display of the AR content may then track the movement of the field of view of the AR device according to user input.

DETAILED DESCRIPTION

Mobile personal computing devices may include one or more portable displays used to overlay virtual objects with real world objects. Virtual content that relates to one or more real world objects (e.g., places, things, people, etc.) and that may be provided on a display may be referred to as Augmented Reality (AR) content. Such AR content may be provided on a display together with the real world objects to which the AR content relates. Further, the views of the real world objects on a display may correspond to computer-generated representations of those objects or, in some embodiments (e.g., where at least a portion of the display passes or channels light), may correspond to actual, non-computer-generated views of the objects.

In many instances, displaying the AR content can interfere with the view of the real world. For example, displayed AR content may overlap with an object of interest in the real world and may obscure either partially or fully a user's view of the real world object of interest. This can be inconvenient, distracting, or dangerous to the user. In other instances, an amount of available AR content may exceed the display capabilities of the device or may require more space on the display than is available within a designated or predetermined virtual content display area on the display. Some disclosed embodiments may address these issues by enabling a user to reposition AR content on a display such that it does not interfere with (or at least interferes with less of) the user's view of real world objects. The disclosed embodiments may also facilitate subsequent and repeated accessing of repositioned AR content.

A method and system for enabling users to select, position, store and reference virtual content within an augmented reality context will in many cases be more efficient, more intuitive, and safer than using algorithms to scale or move content within the view, or other similar techniques.

Exemplary methods and systems are described herein. It should be understood that the word "exemplary" is used herein to mean "serving as an example, instance, or illustration." Any embodiment or feature described herein as "exemplary" is not necessarily to be construed as preferred or advantageous over other embodiments or features. The exemplary embodiments described herein are not meant to be limiting. It will be readily understood that certain aspects of the disclosed systems and methods can be arranged and combined in a wide variety of different configurations, all of which are contemplated herein.

Figure 1:
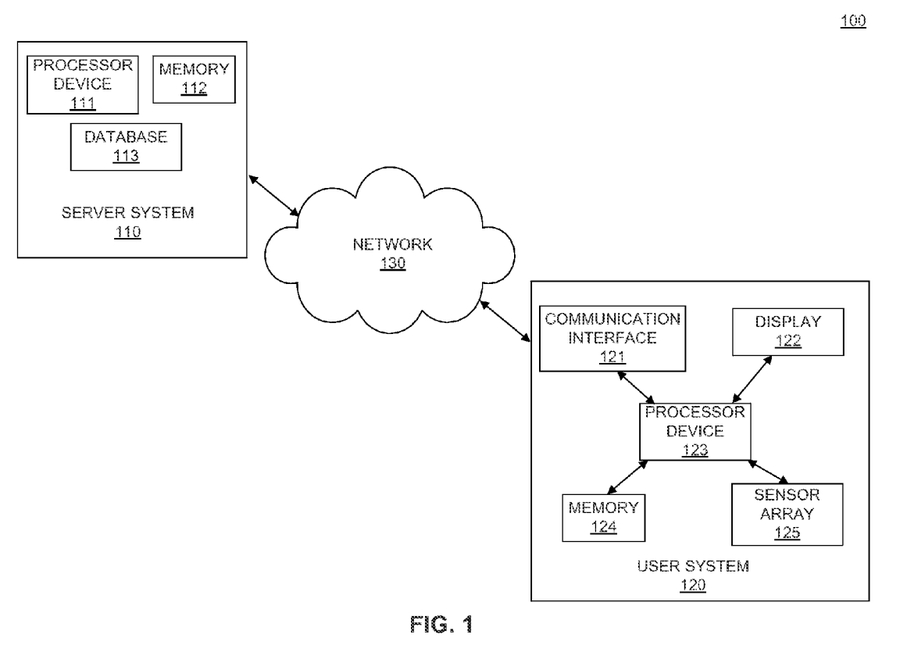
FIG. 1 illustrates an exemplary system for implementing embodiments consistent with the disclosure.

FIG. 1 illustrates an exemplary system 100 for implementing embodiments consistent with disclosed embodiments. In one aspect, system 100 may include a server system 110, a user system 120, and network 130. It should be noted that although a single user system 120 is shown in FIG. 1, more than one user system 120 may exist in system 100. Furthermore, although a single server system 110 is shown in FIG. 1, more than one server system 110 may exist in system 100.

Server system 110 may be a system configured to provide and/or manage services associated with providing AR content to users. Consistent with the disclosure, server system 110 may provide AR content to user system 120 based on information received from user system 120. For example, server system 110 may provide AR content to user system 120 based on a detected position, detected position change, or detected/determined context of user system 120. Such AR content may also be provided to user system 120 based upon requests received from user system 120 or based on a detected and/or recognized object within a field of view of an imaging device associated with user system 120. In general, any type of AR content, including any desired form of information, can be provided from server system 110 to user system 120 based on the requirements of a particular application. Further, any suitable trigger may be used to initiate transfer and/or updating of AR content provided to user system 120 by server system 110.

Server system 110 may include one or more components that perform processes consistent with the disclosed embodiments. For example, server system 110 may include one or more computers, e.g., processor device 111, a CPU, and/or other hardware-based applications processing devices, configured to execute software instructions programmed to perform aspects of the disclosed embodiments. Such software instructions may be stored, for example, in database 113 and when implemented may create and/or maintain a global coordinate system, provide AR objects to user systems for display, transmit information associated with the AR objects to user system 120, or any other relevant function. In one aspect, database 113 may be co-located with server system 110. Alternatively, database 113 may be located remotely from the server system 110. Database 113 may include computing components (e.g., database management system, database server, etc.) configured to receive and process requests for data stored in memory devices of database(s) 113 and to provide data from database 113.

User system 120 may include a system associated with a user (e.g., a consumer, field technician, equipment operator, or any other individual that may benefit from received AR content) that is configured to perform one or more operations consistent with the disclosed embodiments. In one embodiment, a user may operate user system 120 to perform one or more such operations. User system 120 may include a communication interface 121, a processor device 123, a memory 124, a sensor array 125, a display 122, and/or any other components that may facilitate the display of AR content to the user. The processor device 123 may be configured to execute software instructions to perform aspects of the disclosed embodiments. User system 120 may be configured in the form of an AR device, such as a head mounted display (HMD). Although in the present disclosure user system 120 is described in connection with a HMD, user system 120 may include tablet devices, mobile phone(s), laptop computers, and any other computing device(s) known to those skilled in the art.

Communication interface 121 may include one or more communication components, such as cellular, WIFI, Bluetooth transceivers, or any other wireless transceivers or communication equipment. Communication interface 121 may package and send user commands or input across network 130 to server system 110. Based on these commands and/or input, server system may return additional or updated AR content to be displayed to the user by user system 120. This additional or updated AR content, or instructions for providing the additional or updated AR content, may be received from server system 110 via communication interface 121. Processor device 123 may access and use information received via communication interface 121.

The display 122 may include any suitable display for providing AR content to a user. For example, in some embodiments, display 122 may include one or more translucent, transparent, or semi-transparent components configured to pass at least some light from a scene to the eyes of a user. The display 122 may also include opaque lenses or components, e.g., where the images seen by the user are computer-generated, constitute light-guided projections of real world objects, or include images captured by one or more cameras (or other image acquisition devices) associated with user system 120. In such embodiments, generated, captured, and/or light-guided images of real world objects may be projected onto opaque or semi-opaque components associated with display 122. Display 122 may also project information using holographic images.

The sensor array 125 may include any type of sensor configured to provide an output signal useful in providing AR content to a user. In some embodiments, sensor array 125 may include one or more GPS sensors, cameras, barometric sensors, proximity sensors, physiological monitoring sensors, chemical sensors, magnetometers, gyroscopes, accelerometers, bar code scanners, motion detectors, etc.

Processor devices 111 and 123 may include one or more suitable hardware-based processing devices, such as a microprocessor, controller, central processing unit, etc. that can execute software-based instructions. In some embodiments, processor devices 111 and/or 123 may include a microprocessor from the OMAP family manufactured by Texas Instruments, the Snapdragon™ family manufactured by Qualcomm™, or any of various types of processor devices manufactured by other microprocessor manufacturers.

Consistent with disclosed embodiments, one or more components of system 100, including server system 110 and user system 120, may also include one or more memory devices (such as memories 112 and 124) as shown in exemplary form in FIG. 1. The memory devices may include magnetic storage units, optical storage units, RAM, ROM, hard drives, flash memory, etc. Such memory units may be located together with server system 110 and/or user system 120 or may be located remotely with respect to either or both systems. Memory 112 and or 124 may store software instructions that are executed by processor devices 111 and 123, such as one or more applications, network communication processes, operating system software, software instructions relating to the disclosed embodiments, and any other type of application or software known to be executable by processing devices. The memory devices may be a volatile or non-volatile, magnetic, semiconductor, tape, optical, removable, non-removable, or other type of storage device or non-transitory computer-readable medium. The memory devices may be two or more memory devices distributed over a local or wide area network, or may be a single memory device. In certain embodiments, the memory devices may include database systems, such as database storage devices, including one or more database processing devices configured to receive instructions to access, process, and send information stored in the storage devices. By way of example, database systems may including Oracle™ databases, Sybase™ databases, or other relational databases or non-relational databases, such as Hadoop sequence files, HBase, or Cassandra.

In some embodiments, server system 110 and user system 120 may also include one or more additional components (not shown) that provide communications with other components of system environment 100, such as through network 130, or any other suitable communications infrastructure.

Network 130 may be any type of network that facilitates communications and data transfer between components of system environment 100, such as, for example, server system 110 and user system 120. Network 130 may be a Local Area Network (LAN), a Wide Area Network (WAN), such as the Internet, and may include a single network or a combination of networks. Further, network 130 may include a single type of network or a combination of different types of networks, such as the Internet and public exchange networks for wireline and/or wireless communications. Network 130 may utilize cloud computing technologies that are familiar in the marketplace. Network 130 is not limited to the above examples, and system 100 may implement any type of network that allows the entities (and others not shown) included in FIG. 1 to exchange data and/or information.

Figure 2:
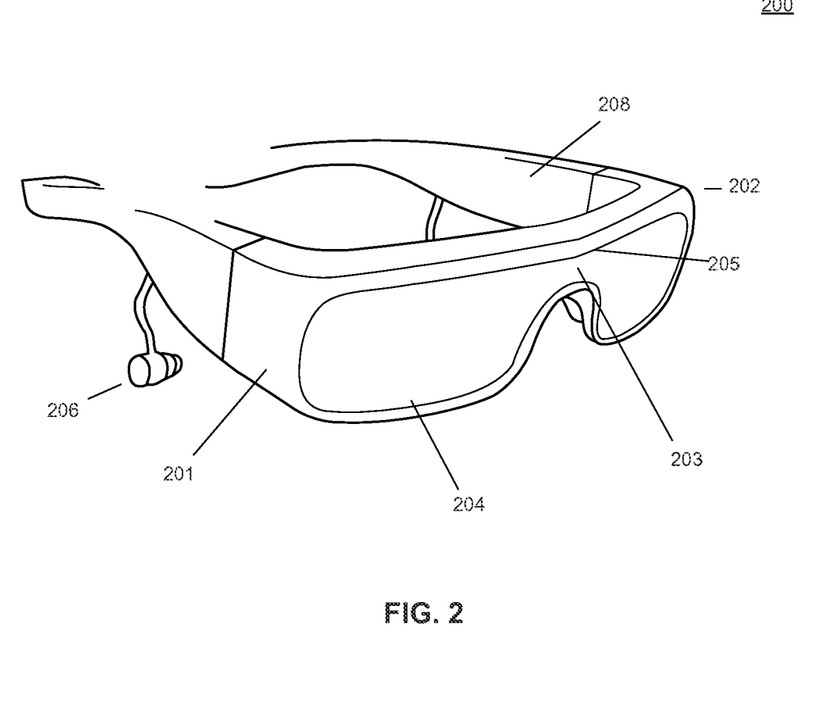
FIG. 2 illustrates an exemplary AR device.

FIG. 2 illustrates an exemplary AR device 200, which may correspond to and include any of the components and features of user system 120. At present, augmented reality glasses are the most common type of AR device. It is also possible to use a smart phone as an AR device. Therefore, it will be understood that the present invention is not limited to augmented reality glasses or any one type of AR device. For example, a relatively simple AR device might involve a projector with a camera interacting with the surrounding environment, where the projection could be on a glass surface or on top of other objects.

As shown in FIG. 2, the AR glasses 200 may include features relating to navigation, orientation, location, sensory input, sensory output, communication and computing. For example, the AR glasses 200 may include an inertial measurement unit (IMU) 201. IMU 201 may include axial accelerometers or gyroscopes for measuring position, velocity and orientation. IMUs may enable determination of the position, velocity and/or orientation of the AR glasses within the surrounding real world environment and/or its position, velocity and orientation relative to real world objects within that environment in order to perform its various functions.

The AR glasses 200 may also include a Global Positioning System (GPS) unit 202. GPS units receive signals transmitted by a plurality of geosynchronous earth orbiting satellites in order to triangulate the location of the GPS unit. In more sophisticated systems, the GPS unit may repeatedly forward a location signal to an IMU to supplement the IMUs ability to compute position and velocity, thereby improving the accuracy of the IMU. In the present case, the AR glasses 200 may employ GPS to identify a location of the AR glasses.

As mentioned above, the AR glasses 200 may include a number of features relating to sensory input and sensory output. AR glasses 200 may include at least a front facing camera 203 to provide visual (e.g., video) input, a display (e.g., a translucent or a stereoscopic translucent display) 204 to provide a medium for displaying computer-generated information to the user, a microphone 205 to provide sound input and audio buds/speakers 206 to provide sound output. In some embodiments, the visually conveyed digital data may be received by the AR glasses 200 through the front facing camera 203.

The AR glasses 200 may also have communication capabilities, similar to other mobile devices, through the use of a cellular, WiFi, Bluetooth or tethered Ethernet connection. The AR glasses 200 may also include an on-board microprocessor 208. The on-board microprocessor 208 may control the aforementioned and other features associated with the AR glasses 200.

In one exemplary embodiment, the AR glasses 200 may include a see-through display and sensor systems that provide the device's location, orientation, and bearing (for example, latitude, longitude, altitude, pitch, roll or degree tilt from horizontal and vertical axes, and compass heading). The AR glasses 200 could be configured as glasses that can be worn by a person. Further, one or more elements of the sensor system may be located on peripheral devices physically separate from the display.

Additionally, in this embodiment, the AR glasses 200 may rely on a computer software application to instruct the glasses to render virtual objects on the display field of view. Virtual objects include, but are not limited to, text, images, models, icons. The user may view or interact with virtual objects using the hardware and software application associated with the AR glasses 200.

Figure 3:
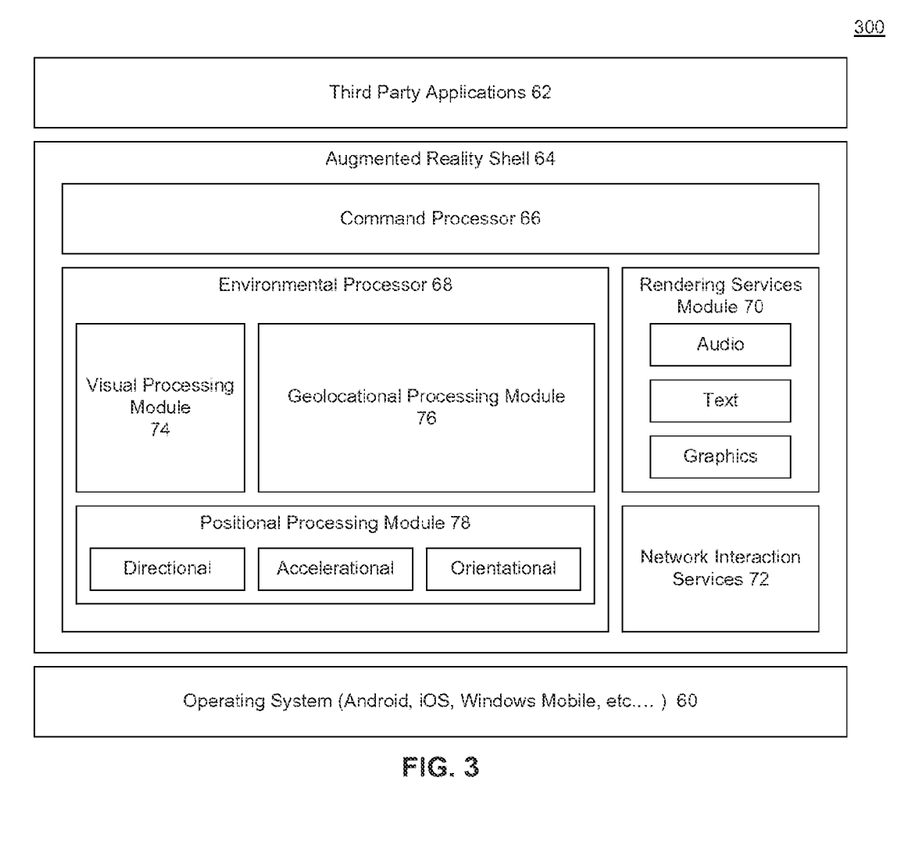
FIG. 3 is a block diagram illustrating a configuration of a software-driven system consistent with the exemplary disclosed embodiments.

FIG. 3 is a system block diagram 300 illustrating a software-driven system associated with an AR device, in accordance with exemplary embodiments of the present invention. As illustrated, the software system may be configured into three layers. At the lowest layer is the augmented reality device operating system 60. The operating system 60 may, for example, be an Android based operating system, an iPhone based operating system, a Windows Mobile operating system or the like. At the highest layer may reside a third party applications layer 62. Applications that are designed to work with the operating system 60 that either came with the AR device or were loaded by the user may reside in this third layer.

The middle layer is referred to as the augmented reality shell 64. The augmented reality shell 64, as shown, includes a number of components including a command processor 66, an environmental processor 68, a rendering services module 70, and a network interaction services module 72. It should be understood that each of the functional modules and/or components may be hardware, software, firmware or a combination thereof.

The environmental processor 68, in general, monitors the surrounding, real world environment of the AR device based on input signals received and processed by the AR device (e.g., from sensor array 125). The environmental processor 68 may be implemented, as shown in FIG. 3, similar to the other processing components, or it may be implemented separately, for example, in the form of an application specific integrated chip (ASIC). In one embodiment, the environmental processor 68 may be configured to operate whenever the AR device is powered on.

The environmental processor 68, in turn, may also include several processing modules: a visual processing module 74, a geolocational processing module 76, and a positional processing module 78. The visual processing module 74 is primarily responsible for processing the received video, detecting and decoding the frames and processing the digital data included with the video that was visually conveyed to the AR device.

The geolocational module 76 receives and processes signals relating to the location of the AR device. The signals may, for example, relate to GPS coordinates, the location of a WiFi hotspot, or the proximity to one or more local cell towers.

The positional module 78 receives and processes signals relating to the position, velocity, acceleration, direction and orientation of the AR device. The positional module 78 may receive these signals from an IMU (e.g., IMU 201). The positional processing module 78 may, alternatively or additionally, receive signals from a GPS receiver, where it is understood that the GPS receiver can only approximate position (and therefore velocity and acceleration) and where the positional processing module 78 can then provide a level of detail or accuracy based on the GPS approximated position. Thus, for example, the GPS receiver may be able to provide the general GPS coordinates of a movie theater, but the positional processing module 78 may be able to provide the user's orientation within the movie theater. The positional processing module 80 may be employed in conjunction with the visual processing module 74 to synchronize user head movements with viewing experiences (e.g., what the rendering services module 70 will render on the display and, therefore, what the user sees).

In addition to the environmental processor 68, the augmented reality shell 64 includes a command processor 66 and a rendering services module 70. The command processor 66 processes messaging between the modules and/or components. For example, after the visual processing module 74 processes the digital data that was visually received through the video, the visual processing module 74 communicates with the command processor 66 which, in turn, generates one or more commands to the rendering services module 70 to produce the computer generated data (e.g., text, graphics, additional video, sound) that will be used to supplement the video and enhance the user's viewing experience.

The rendering services module 70 may process the content of the digital data that was visually received and, based on instructions provided through the command processor 66, generate and present (e.g., display) data in the form of sound, graphics/animation, text, additional video and the like. The user can thus view the video and, in addition, experience the computer-generated information to supplement the video and enhance the viewing experience.

In some embodiments, the software applications associated with the AR device may create and maintain coordinate systems that correspond to the position and orientation of the AR device, the field of view of the AR device, and the virtual content. These coordinate systems may correspond to locations in the real physical world or may be referenced with respect to the AR device or to any other suitable reference. The maintained coordinate systems may include a two dimensional Cartesian coordinate system, a three dimensional Cartesian coordinate system, a two dimensional Spherical coordinate system, a three dimensional Spherical coordinate system, or any other suitable coordinate system.

AR content, including virtual objects or information, may be rendered at positions on the display of the AR device defined by the software application. These positions may be relative to the user. For example, the initial position for display may be in the center of the user's field of view or at any other desired location with the user's field of view. The AR content may also be rendered such that the user perceives the AR content as associated with a particular location or object in the real world. For example, the virtual content may be rendered on the display to appear to the user as located at coordinate positions corresponding to a location in the real-world, for example, referring to a specific geographic coordinate, or to the current coordinate location of another person or object. User movements relative to the specific geographic coordinate, person, object, etc. may prompt the system to update the display of the AR content such that it appears snapped to the specific geographic coordinate, person, object, etc.

If the user desires to move or "snap" the virtual content to a new position, the user may select a virtual object, or group of objects, using an input method supported by the hardware and software application associated with the AR device. For illustration purposes, one method could be to move a selection device, such as a mouse or pointer device. Another method would be to use gesture inputs (pointing of a finger, etc.), a push button device, touch sensitive surface, or voice commands to augment selection. Another exemplary method would be to use a reticle rendered on the display that would allow head-movements made by the user to indicate the direction or location of the virtual object to be selected. Following the selection, the user may define a new position for the virtual object relative to the display of the AR device.

For example, in an exemplary embodiment, a user may of user system 120/AR glasses 200 may include a field technician, and the AR content to be displayed may include a service manual for a particular type of equipment. Initially, and by operation of a voice command, input device, etc., the technician may request display of AR content in the form of the service manual. In some embodiments, this information may be retrieved from server system 110 or may be retrieved from a local memory 124 and may be displayed in display 122. Initially, the AR content may be displayed in the center of the user's field of view. Such positioning would enable natural access and viewing of the desired content. AR content in the center of the user's field of view, however, may be distracting or may impede the view of the real world objects with which the technician needs to interact. Therefore, system 120 may be configured to re-position the AR content to another location on display 122 or even to another location in virtual space (maintained in memory) relative to the user (e.g., relative to the user's head position). As will be described in detail below, the repositioned AR content can be accessed by the user. For example, the user may turn his head in the direction of the repositioned AR content and, based on the sensed motion of the head, the rendering of the AR content may be updated relative to the motion of the user's head. In some embodiments, the rendered AR content may appear to the user as fixed at the repositioned location, and the user may turn his head in the direction of the repositioned location in order to bring the AR content toward and into the center of the field of view of display 122. Subsequent turning of the head away from the repositioned location will cause the rendered AR content on the display to move away from the center of the field of view. In this way, the user (e.g., the technician) may move the desired AR content to a virtual location that does not impede viewing of objects in the center of the field of view, but that still allows access to the desired AR content, for example, by turning toward the virtual position of that content.

The user may define the new position of the virtual object by using an input device or method supported by the hardware and software associated with AR device. For example, one method would be to "drag and drop" by first selecting the content to be moved, moving it by dragging it to the desired new location and deselecting it to drop it in the new, repositioned location. Establishing a new position of the virtual object may create a new coordinate or change an existing coordinate associated with the virtual object in the software application of the AR device.

The user (or routines in the software) may define additional snapping properties or rules associated with the virtual objects or new coordinates. These properties may include parameters, tags, or instructions for the software application of the AR device. For example, a property of the "snapped" virtual AR content may be to share the new coordinates for the object with other users of the system 100. Another example may be to delete the new coordinates of the virtual objects after a period of time and then revert to the previous position. Yet another example would be to lock the virtual object from being moved to another coordinate by a different user of the AR device.

When the user initiates the steps to "snap" a virtual object to a new position, the software application of the AR device may use information from sensor systems to define a first coordinate system for the AR device and a second coordinate system for the virtual object that is selected by the user, which may be referred to as cardinal snapping herein.

Figure 4:
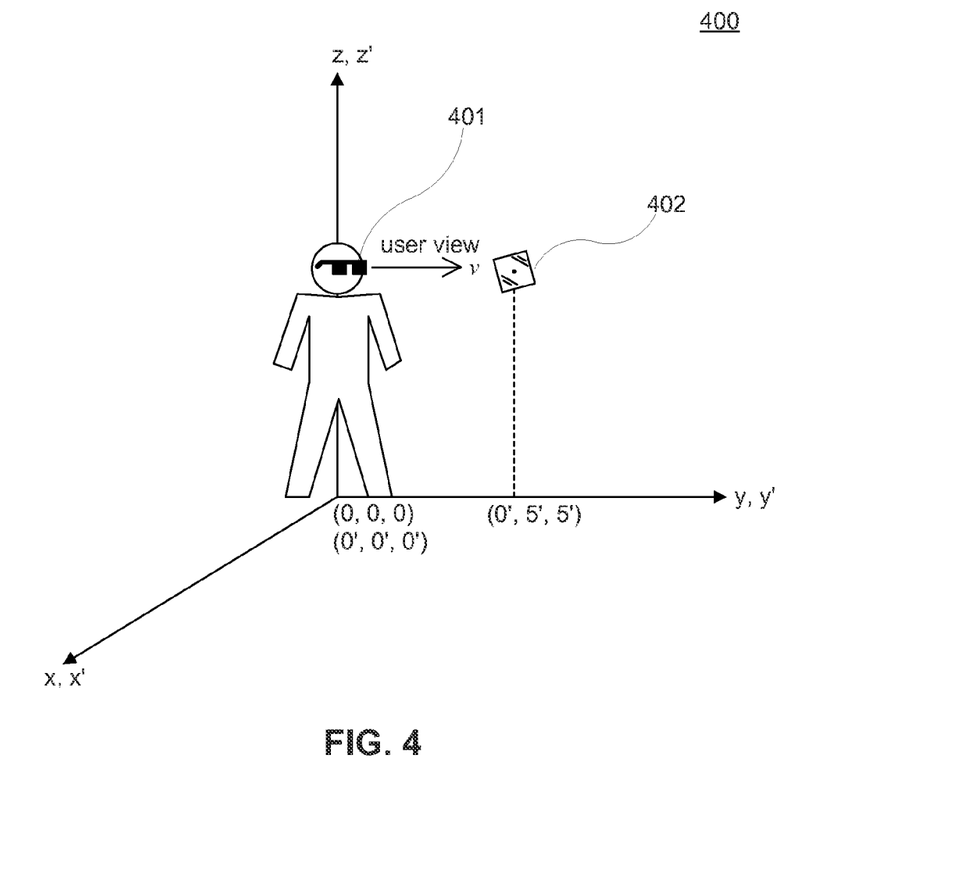
FIG. 4 illustrates an initial position of the AR device and a perceived location of AR content in the respective coordinate systems consistent with the exemplary disclosed embodiments.

FIG. 4 is a diagrammatic representation of a coordinate space 400 consistent with the exemplary disclosed embodiments. As shown in FIG. 4, the orientation of the AR device 401 may be defined according to a first coordinate system (x, y, z), and the position (or perceived position) of the AR content 402 may be defined according to a second coordinate system (x', y', z'). In some embodiments, the origin of the second coordinate system may be defined by user input, such as through a menu function, speech command, and so on. In some embodiments, the first and the second coordinate systems may have the same origin when they are defined. For example, in FIG. 4, the first and the second coordinate systems have the same origin defined as (0, 0, 0) and (0', 0', 0') respectively.

In some embodiments, the origin of the first coordinate system may be centered at the AR device, and the field of view of the user may be tracked in the first coordinate system. In one embodiment, the field of view may be associated with a vector having an origin at the position of the AR device in the first coordinate system and extending along a line normal to the display of the AR device at the center of the field of view of the AR device. For example, in FIG. 4, the user's field of view may be associated and tracked with a vector, v, having origin at (0, 0, 5) and proceeding along the y-axis. Alternatively, the field of view can be defined as a two-dimensional shape (e.g. an arc), or a three-dimensional shape (e.g. a conic section). The virtual object may be given coordinates in the second coordinate system that associate its location relative to the current field of view of the user. For example, in FIG. 4, the coordinates of the AR content 402 are defined to be (0', 5', 5') in the second coordinate system. While the AR content may be displayed on a display associated with AR device 401, the user may perceive the location of the AR content as residing at (0', 5', 5') in the second coordinate system.

When the user of the AR device moves, the AR device moves in a corresponding fashion with the user. For example, if the user translates in space, the AR device will similarly translate, and if the user's head rotates, the AR device and the associated field of view vector will similarly change direction along with the head rotation. The sensors in the AR device provide data to the application of AR device which may prompt or enable the application to monitor information associated with the display including, for example, the current location, orientation and/or bearing of the display unit. This information, in turn, may be used to update or change aspects of images or information presented to the user within the user's field of view on the display unit.

The field of view of the user may intersect the virtual object. The user may select the virtual object using input methods supported by the hardware and software of the AR device. The user may take action to define a new position for the virtual object in the second coordinate system. The new position of the virtual object may be outside of the field of view of the user. For example, the user may choose to move the AR content 90 degrees (or more) to the right of the user. In another example, the software application of the AR device may have pre-defined locations within which the user can position virtual objects, or automatic or default locations where virtual objects may be positioned by the user.

In some embodiments, the AR device may present a menu option for the user to move the virtual object to a pre-defined position relative to the user, for example, 90 degrees to the right of the user's current field of view. The hardware and software application of the AR device may also be configured to allow the user to move the virtual object to a new position by changing the orientation and/or position of the AR device. For example, the AR device may be configured to enter a "position virtual content" mode to allow the user to select a new position of the virtual object by movements. In the "position virtual content" mode, the AR device may track the orientation and/or position of the AR device for new placement of the virtual object. In this mode, AR device 401 may interpret motions of the head, for example, as providing a desired relative change in perceived location of the AR content and may move the AR content accordingly. In such a mode, the AR content may appear to the user as locked in the center of the field of view while the head rotates and "moves" the AR content to its new, desired location. For example, in FIG. 4, if the user wishes to reposition the AR content 90 degrees to the right, the user could select the AR content (e.g., by menu option, voice command, reticle positioning, activation of a selection tag associated with the AR content, input through a hardware-based input device, etc.) for repositioning. Once selected, the AR device 401 could lock the AR content at its current location on the display associated with the AR device (e.g., in the center of the display). Then, the user could rotate his head 90 degrees to the right to position the AR content at the new location of (5', 0', 5'). After repositioning, the AR device can exit the repositioning mode and drop the AR content in its new, snapped location. As noted previously, this repositioning of AR content can also be accomplished using predetermined presets rather than movements of the user's head.

After snapping the AR content in the repositioned location, the AR device may return to a "viewing mode" in which the AR content appears to remain fixed in coordinate system x', y', z'. In viewing mode, rotations of the user's head will result in a changing direction of field of view vector, v, which may result in a changing real world view. The location of the AR content, however, will appear to remain fixed in its repositioned location. Therefore, rotation of the user's head in viewing mode will, in most embodiments, not result in a corresponding motion of the AR content. Instead, this content will appear to reside at its repositioned location, and the user may access it by looking in the direction of the repositioned location.

Figure 5:
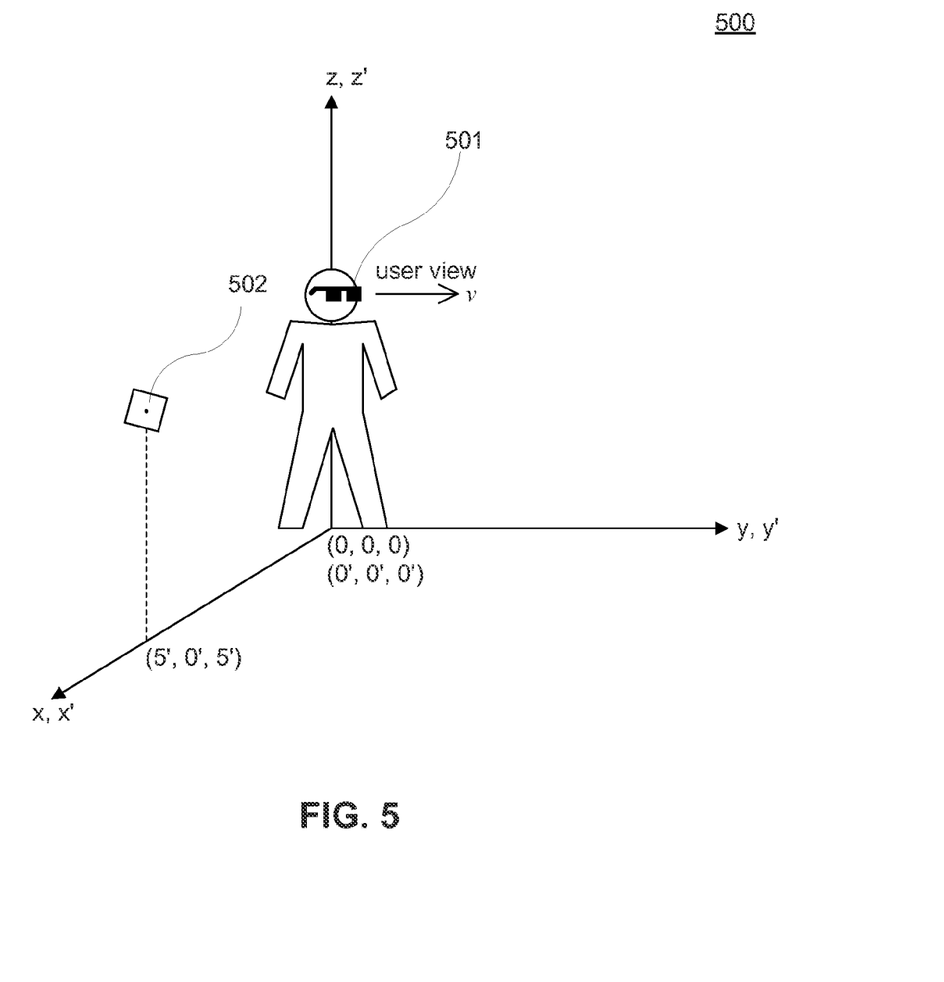
FIG. 5 illustrates an example of snapped AR content in a coordinate system consistent with the exemplary disclosed embodiments.

FIG. 5 is a diagrammatic representation of snapped AR content 500 consistent with the exemplary disclosed embodiments. In this example, AR content 502 is snapped 90 degrees to the right of the user's field of view, from the initial position of (0', 5', 5') shown in FIG. 4, to coordinates of (5',0', 5') according to the second coordinate system. Here the user's field of view again may be defined by a vector v. As shown in FIG. 5, the vector v has an origin at the position of the AR device 501 which is defined to be (0, 0, 5) in the first coordinate system, and proceeds along the y-axis. As a result of the AR content snapping, the AR content 502 may be moved outside of the user's field of view in this example. Whether the AR content is within or outside of the user's field of view, however, may depend on the capabilities of the particular display device and the viewing angle associated with the field of view of the display. It should be understood that the AR content may be snapped to be within the user's field of view consistent with the disclosed embodiments.

As shown in FIG. 5, the snapped AR content 502 is moved 90 degrees (in this exemplary embodiment) to the right of the user's field of view by user input. In some embodiments, the snapped AR content 502 may be redisplayed in the user's field of view when the user changes the orientation of the AR device during viewing mode, for example, by moving the AR device 90 degree right such that vector v intersects AR content 502. In other words, the snapped AR content may be redisplayed within the user's field of view in response to the movement of the orientation and/or position of the AR device.

In some embodiments, the software application of the AR device may present an option to the user to enter an AR content "locked mode" where the AR content will appear to remain at its repositioned location relative to a certain reference user view vector, v. In locked mode, movements affecting the position of AR device 501 relative to coordinate system x, y, z may be duplicated in rendering the AR content 502. That is, the software application of the AR device may associate the two coordinate systems in such a way that any translations, rotations, or changes to the position of the AR device or the field of view in the first coordinate system are duplicated by similar translations, rotations, or changes to the position of the virtual object in the second coordinate system. This locked mode may allow the user to move freely within an environment without modifying or losing the relative position of the snapped AR object. For example, if the user positions an AR object at a location 45 degrees to the left of the user's field of view center (e.g., to enable access to the AR content with a 45 degree leftward rotation of the head during viewing mode), then the user may wish to retain that 45 degree relative relationship between the field of view vector, v, and the position of the AR content even if the user moves to an entirely different working area where the user's field of view vector points in a direction than the vector used as a reference to establish the relative position of the AR content. In some respects, "locked mode" allows the user to "carry" the AR content to a new user location while maintaining the desired relative positioning of the AR content. Upon reaching the new location, the user can exit lock mode, and the new direction of user view vector, v, may be used as the reference for the relative position of the AR content. In this way, the selected position of the AR content may be maintained in a desired location despite translation or rotational movements associated with a change in user position.

In some embodiments, the software application of the AR device may enable entry into the locked mode through selection of a menu item (e.g., "Lock Snapped Content") to the user. The user may toggle the option of "Lock Snapped Content" to be in an on or off state. When the "View Snapped Content" option is selected to be on, the position of the AR content may track the position of the AR device, and any translations, rotations, or changes to the position of the AR device or the field of view in the first coordinate system may be duplicated as identical translations, rotations, or changes to the perceived position of the virtual AR content in the second coordinate system. On the other hand, when the "Lock Snapped Content" option is turned off, the position of the AR content may be independent from the movement of the AR device, and may not track the position of the AR device.

Figure 6:
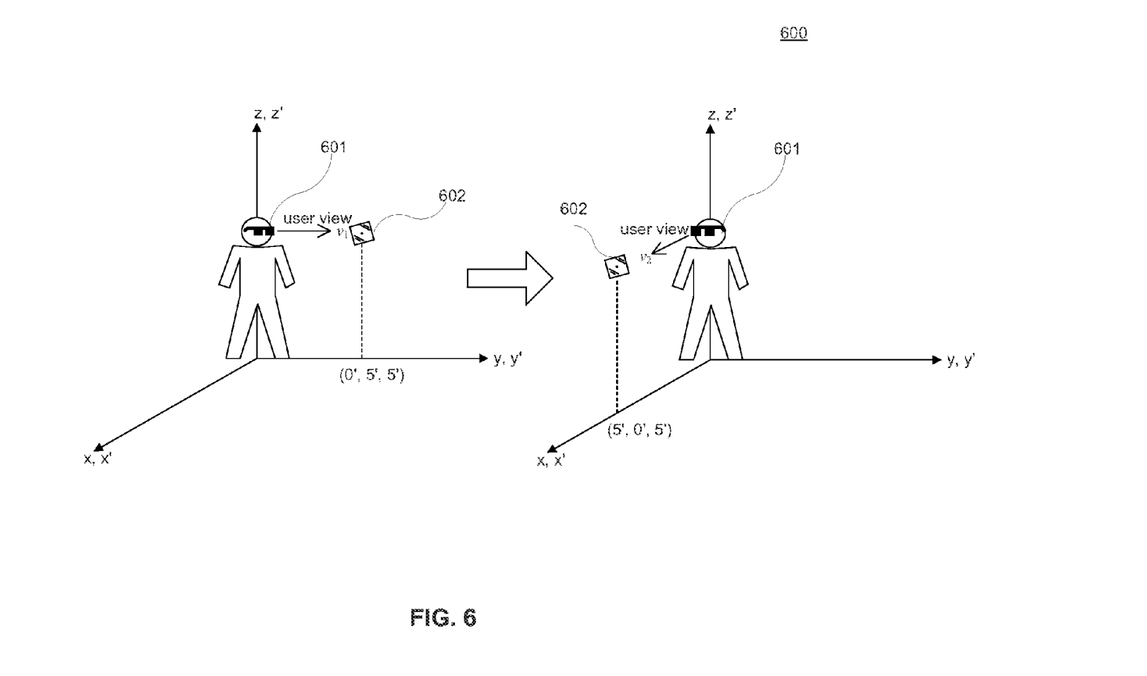
FIG. 6 illustrates an example of AR content movement consistent with the exemplary disclosed embodiments.

FIG. 6 illustrates an example 600 of AR content movement consistent with the exemplary disclosed embodiments. As shown in FIG. 6, the AR device 601 is initially oriented toward the direction of the y-axis, and the center of the user's field of view may be defined as a vector $v_1$. The vector $v_1$ has an origin at coordinates of (0, 0, 5) in the first coordinate system, and proceeds along the y-axis. The initial coordinates of the AR content 602 may be defined to be (0', 5', 5') in the second coordinate system. To reposition the AR content, the user may place AR device 601 in locked mode such that movements of AR device 601 cause similar apparent movements in the virtual location of AR content 602. For example, to reposition AR content 90 degrees to the right, the user may select locked mode and then rotate the AR device 90 degree to the right of the original field of view vector. Correspondingly, the user's field of view is changed to a new vector $v_2$. The vector $v_2$ has an origin at coordinates of (0, 0, 5) in the first coordinate system, and proceeds along the x-axis. In locked mode, the changes to the position of the AR device 601 or the field of view in the first coordinate system may be duplicated by similar changes to the position of the AR content 602 in the second coordinate system. As a result, the AR content 602 also appears to be rotated 90 degrees to the right of vector $v_1$ in the second coordinate system, and the perceived position of the AR content 602 may change to (5', 0', 5') relative to the second coordinate system. In doing so, the AR content 602 is locked to be within the user's current field of view regardless of the movement of AR device.

Once the AR content has been located to a desired position, the user may exit locked mode and re-enter viewing mode. In viewing mode, movements of AR device 601 may not affect the perceived location of AR content 602. Rather, in the example above, the AR content would appear to remain at position (5', 0', 5') regardless of rotation of the AR device 601. Such a viewing mode enables a user to look along vector $v_1$ until the user desires to access the AR content. To access the AR content in its new location, the user would rotate his head thereby turning AR device 601 such that the field of view vector would correspond with vector $v_2$ shown in FIG. 6. At this point, vector $v_2$ would intersect with the perceived location of AR content 602 and the software executed by the processor device of system 120/AR device 601 would render the AR content in the center of the user's field of view to create the perceived effect that the user is looking at the AR content as a position of (5', 0', 5') relative the second coordinate system.

It should be noted that the described viewing mode may include a translation lock component. In translation-locked viewing mode, the perceived location of AR content 602 may remain unchanged as the AR device 601 rotates (which enables the user to "look" toward and away from the AR content). Translation of the AR device, however, may result in similar translation of the perceived location of the AR content. For example, if the AR content is positioned 90 degrees to the right of a reference field of view vector, then in translation-locked mode, walking with AR device 601 may result in a perception that AR content similarly translating through space while hovering at a position 90 degrees to the right of the user's current center of field of view vector.

Figure 7:
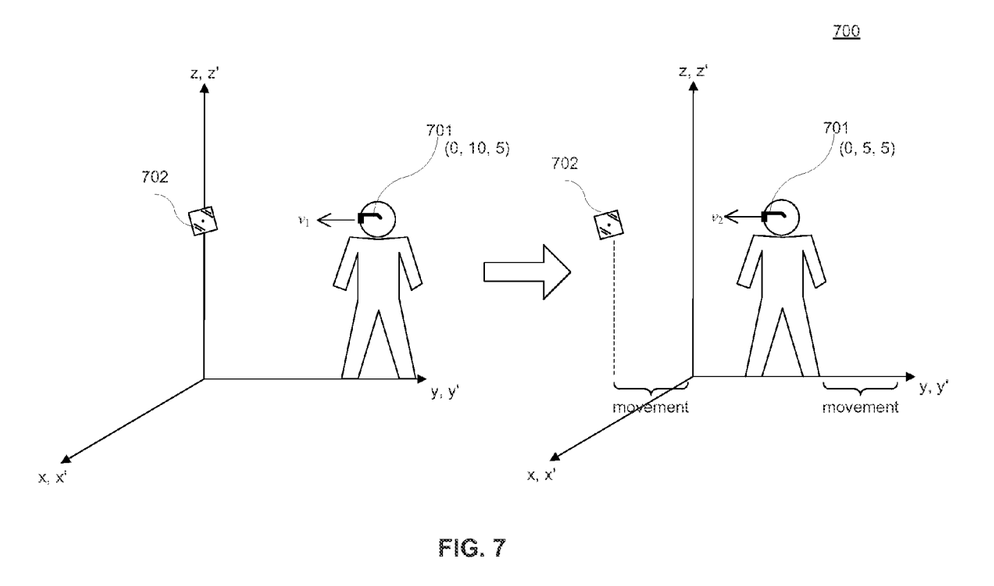
FIG. 7 illustrates another example of AR content movement consistent with the exemplary disclosed embodiments.

FIG. 7 illustrates an example 700 of AR content movement consistent with the exemplary disclosed embodiments. Specifically, FIG. 7 provides an example of translation-locked viewing mode. In this example, AR device 701 may be initially oriented around a vector $v_1$ facing in the negative y direction and having an origin at coordinates (0, 10, 5). AR content 702 may be positioned at a perceived location of (0', 0', 5'). In the translation-locked viewing mode, if the user moves toward the origin along the negative y direction (e.g., such that the field of view vector $v_1$ having an origin at (0, 10, 5) translates to a field of view vector $v_2$ having an origin at (0, 5, 5)), then the display of device 701 will be correspondingly updated such that AR content 702 appears to translate along with the user's movements. Thus, in this mode, rotations of the user's head and corresponding rotations of the AR device 701 may result in corresponding motion of the displayed AR content within the user's field of view (e.g., the user may be able to freely look at and away from the AR content by rotating the head), but no apparent movement in the perceived location of the AR content relative to coordinate system x, y, z. On the other hand, in translation-locked viewing mode, translations of AR device 701 may result in changes in the perceived location of AR content 702 relative to coordinate system x, y, z.

Figure 8:
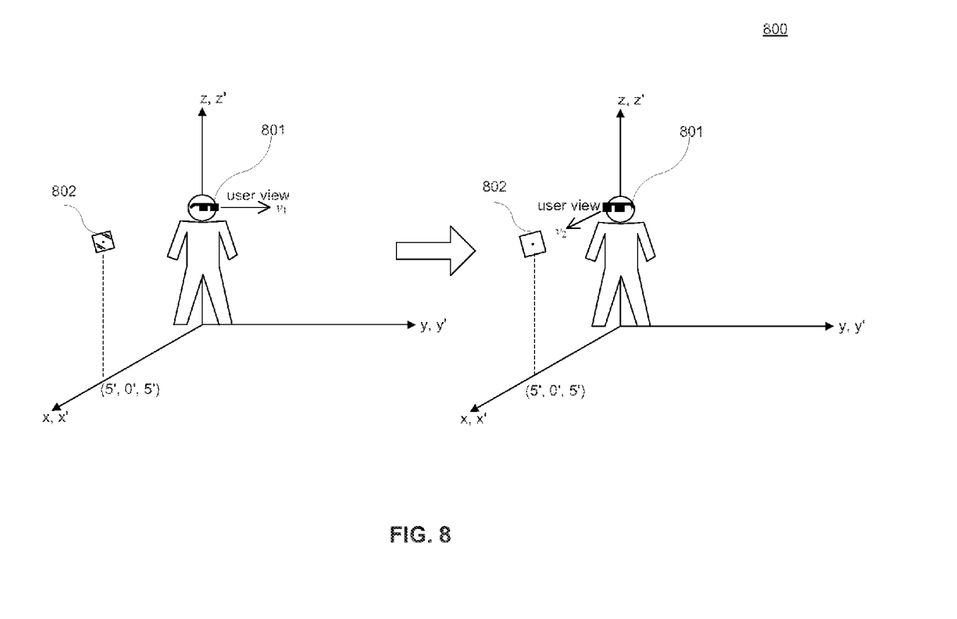
FIG. 8 illustrates an example of updating a display of AR content consistent with the exemplary disclosed embodiments.

FIG. 8 illustrates an example 800 of updating a display of AR content consistent with the exemplary disclosed embodiments. Particularly, FIG. 8 provides an example of normal viewing mode where a user can access AR content located at a perceived location relative to coordinate system x', y', z' by looking in the direction of that perceived location. As shown in FIG. 8, the AR device 801 is initially oriented toward the direction of the y-axis, and the user's field of view is centered about a vector $v_1$. The vector $v_1$ has an origin at coordinates of (0, 0, 5) in the first coordinate system, and proceeds along the positive y-axis. The initial coordinates of the AR content 802 are defined to be (5', 0', 5') in the second coordinate system. The user then rotates the AR device 90 degrees to the right. Correspondingly, the user's field of view is changed to be centered about a vector $v_2$. The vector $v_2$ has an origin at coordinates of (0, 0, 5) in the first coordinate system, and proceeds along the positive x-axis. In this viewing mode, the position of the AR content 802 in the second coordinate system does not track the rotational changes of the position of the AR device 801 relative to the first coordinate system. Accordingly, the AR content 802 appears in the display of device 801 to remain at the perceived position of (5', 0', 5') in the second coordinate system In some implementations, the user may select an option in the AR device software application that disassociates the two coordinate systems from each other such that any translations, rotations, or changes to the position of the AR device or the field of view in the first coordinate system are performed independently of the second coordinate system. For example, in some embodiments, the user may choose to snap the AR content at a particular location relative to the second coordinate system (x, y, z) and effectively "leave it" in that location. This embodiment may be described as a real-world locked viewing mode. For example, when presented with AR content, the user may wish to snap that content at a fixed position in the second coordinate system, for example, at a desired perceived location relative to a real world object. Then, the user may move away from the real world object to a new location. Looking back toward the AR content, the AR content will be rendered on the user's display such that the user perceives the AR content as remaining in the selected position. That is, the AR content will appear farther away if the user moves away from the selected location.

Such AR content may also be made available to other users of system 100. For example, if AR content is provided to one or more users, and any of those users snaps the content in a selected position relative to coordinate system x', y', z', then other users of system 100 may perceive the same AR content in the position designated by the position-selecting user.

Figure 9:
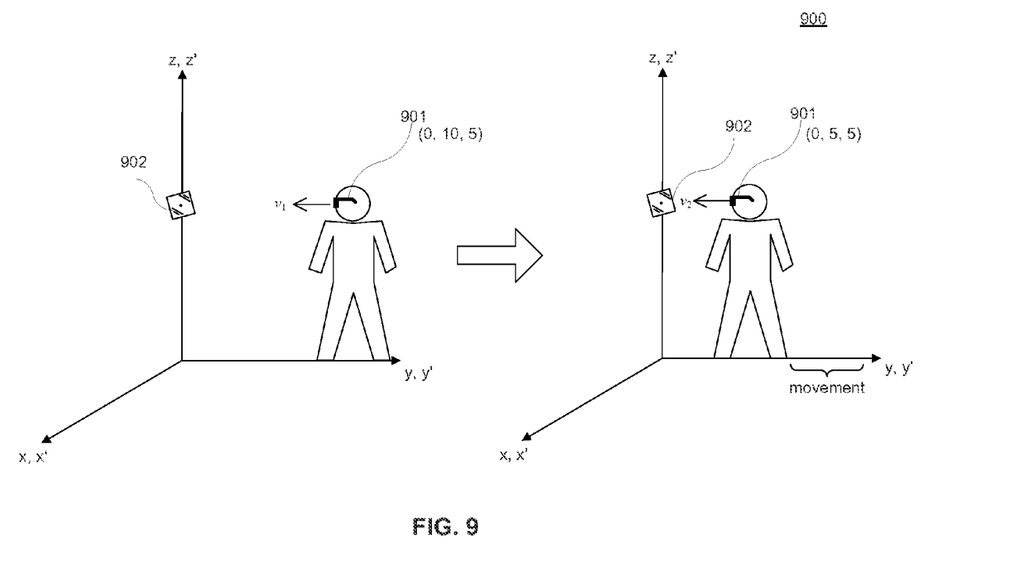
FIG. 9 illustrates another example of updating a display of AR content consistent with the exemplary disclosed embodiments.

FIG. 9 illustrates another example 900 of updating display of AR content consistent with the exemplary disclosed embodiments. Specifically, FIG. 9 provides an example of real-world locked viewing mode. In this example, AR device 901 is initially oriented along the negative y-axis direction, and the user's field of view is centered about a vector $v_1$. The vector $v_1$ has an origin at coordinates of (0, 10, 5) in the first coordinate system. The initial coordinates of the perceived location of AR content 902 are defined to be (0', 0', 5') relative to the second coordinate system. The user then moves toward the origin in the negative y direction such that the user's field of view vector translates to vector $v_2$, which has an origin at coordinates of (0, 5, 5) in the first coordinate system and proceeds along the negative y direction. Because in this mode the AR content is snapped to a real world location, the perceived relationship between the perceived location of the AR content and the location of the AR device 901 is not maintained. Rather, as AR device 901 translates through space, the perceived location of AR content 902 will appear to remain at the position of (0', 0', 5') in the second coordinate system. In doing so, the perceived relative position between the AR content 902 and the AR device 901 changes, and the AR content 902 is displayed on the display of AR device 901 such that it appears nearer to the AR device in the current user's field of view.

When the user initiates the steps to "snap" a virtual object to a new position, the AR device may set up a first coordinate system for the AR device that includes the field of view. The AR content to be snapped may be stored in memory until it is assigned a location in a second coordinate system. The second coordinate system has an origin that may be defined by the software application of the AR device. The virtual object may then be snapped to a location, position, orientation defined in the second coordinate system.

In one embodiment, the second coordinate system may be associated with external coordinate data that corresponds to locations in the real physical world (e.g., latitude, longitude and altitude, or indoor locations defined by a model, map or other means). In another embodiment, the first coordinate system may be associated with external coordinate data. In yet another embodiment, both coordinate systems may be associated with external coordinate data.

The sensors in the AR device may provide output signals and/or data to the software application of the AR device indicative of the current location, orientation and/or bearing of the display unit (and therefore the user). This information, in turn, may be used to update or change aspects of images or information presented to the user within the user's field of view on the display unit.

In some embodiments, perceived locations of AR content (e.g., relative to the second coordinate system) may be defined based on recognized glyphs. Such glyphs may include any object or thing appearing in the real world that may be recognized within a scene and with which AR content may be associated. For example, glyphs may include but are not limited to images, markers, physical objects, one dimensional or two dimensional codes (e.g., a QR code), people, places, buildings, etc. which may be captured by the AR device (e.g., through an image acquisition device such as a camera) and recognized by the software application of the AR device (e.g., through computer vision algorithms). As a result of recognition of a glyph, AR content may be recalled from memory (either local or from a server system, etc.) and provided to the user. For example, in some embodiments, the AR content may be rendered on the display of the AR device such that it appears to the user as located at a predetermined position relative to the glyph. For example, if the glyph is a QR code on an object, the AR content may be provided such that it appears to the user as hovering 6 inches above the object. Of course, and suitable relative location may be used for providing the AR content with respect to the recognized object/glyph. This process may be referred to as glyph snapping. Notably, glyph-snapped AR content may be made available to multiple users of system 100 and to all users, no matter their location, may appear in the same predetermined location relative to the recognized glyph.

The second coordinate system may be defined by software application of the AR device when a glyph is identified by the hardware and software application of the AR device. The origin of the second coordinate system may correspond to a point rendered on the display of the AR device in recognition of the glyph. For example, the origin point rendered on the display may be an overlay on top of the glyph, offset from the glyph or in some other location on the user's current field of view.

In some embodiments, the user may select a virtual object, using input methods supported by the hardware and software application of the AR device. The user may take action to define a new position for the virtual object in the second coordinate system. The virtual object may be associated with glyph. As the user and the AR device move and the glyph moves in real-world physical space, the virtual object may be rendered on the display in the user's field of view when the glyph is recognized by the hardware and software applications of the AR device.

In some embodiments, the AR device may be configured to be capable of perform cardinal snapping, glyph snapping, or a combination of them, for AR content. The AR device may be configured to switch from one snapping mode, such as global snapping, to another snapping mode, such as cardinal snapping, by user input such as menu options, speech command, etc.

It should be further understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. An augmented reality (AR) device, comprising:
a display configured to display real-world content overlayed with AR content;
at least one sensor configured to provide an output of a movement of a head of a user on which the AR device is worn, the output being indicative of an orientation, location, or motion of the AR device; and
a processor device configured to:
cause the AR content to be shown on the display;
in response to receiving a first input from the user activating a locked mode, lock the AR content on the display such that the AR content does not move relative to the display when the head changes orientation with respect to a body of the user, wherein when the AR content becomes locked, the head is at a first orientation with respect to the body, and the AR content is at an initial location in a virtual space;
detect a change in the orientation of the head from the first orientation to a second orientation with respect to the body while the AR content is locked on the display, and as the orientation of the head changes from the first orientation to the second orientation, move the AR content from the initial location in the virtual space to a new location in the virtual space;
receive a second input from the user deactivating the locked mode after the head becomes positioned at the second orientation and after the AR content is moved to the new location in the virtual space; and
after deactivating the locked mode, fix the AR content at the new location in the virtual space such that the AR content does not move in the virtual space as the head changes orientation with respect to the body.

2. The device of claim 1, wherein fixing the AR content at the new location in the virtual space such that the AR content does not move in the virtual space as the head changes orientation with respect to the body is configured to cause the user to perceive the AR content as fixed at the new location relative to real-world content.

3. The device of claim 1, wherein the initial location on the display is located away from a center of a field of view of the AR device, the new location is closer to the center of the field of view of the AR device than the initial location, and moving the AR content from the initial location to the new location is caused by rotation of the head in the direction of the new location of the AR content.

4. The device of claim 1, wherein the processor device is configured to receive information relating to a user selection of the initial location of the AR content.

5. The device of claim 4, where selection of the initial location is facilitated by a user input device.

6. The device of claim 5, wherein the user input device includes one or more of a mouse, pointer device, gesture recognition unit, push button device, touch sensitive surface, or voice recognition unit.

7. The device of claim 1, wherein the processor device is configured to move the AR content within the virtual space in response to a rotational orientation change of the head.

8. The device of claim 1, wherein the processor device is configured to activate a translation-locked viewing mode in response to receiving a user input activating the translation-locked viewing mode, in which mode the AR content does not move relative to the head when the head undergoes a translational orientation change.

9. The device of claim 1, wherein causing the AR content to be shown is in response to a recognized glyph.

10. The device of claim 9, wherein the AR content is shown on the display such that the AR content resides at a predetermined perceived location relative to the recognized glyph.

11. The device of claim 1, further including a data interface configured to receive information associated with the AR content from a location remote from the AR device.

12. The device of claim 11, wherein the data interface includes a data connection to the Internet.

13. The device of claim 11, wherein the data interface includes a wireless transceiver device.

14. The device of claim 1, wherein the processor device is further configured to snap the AR content to a location in physical space to make the AR content accessible to other users within a predetermined distance to the location in physical space.

15. A method of displaying augmented reality (AR) content comprising:
   causing the AR content to be shown on a display associated with an AR device worn on a head of a user;
   in response to receiving a first input from the user activating a locked mode, locking the AR content on the display such that the AR content does not move relative to the display when the head changes orientation with respect to a body of the user, wherein when the AR content becomes locked, the head is at a first orientation with respect to the body, and the AR content is at an initial location in a virtual space;
   detecting a change in the orientation of the head from the first orientation to a second orientation with respect to the body while the AR content is locked on the display, and as the orientation of the head changes from the first orientation to the second orientation, moving the AR content from the initial location in the virtual space to a new location in the virtual space;
   receiving a second input from the user deactivating the locked mode after the head becomes positioned at the second orientation and after the AR content is moved to the new location in the virtual space; and
   after deactivating the locked mode, fixing the AR content at the new location in the virtual space such that the AR content does not move in the virtual space as the head changes orientation with respect to the body.

* * * * *